June 21, 1932. L. B. SPERRY 1,864,282
SEAT SUPPORT
Filed April 26, 1930 2 Sheets-Sheet 2
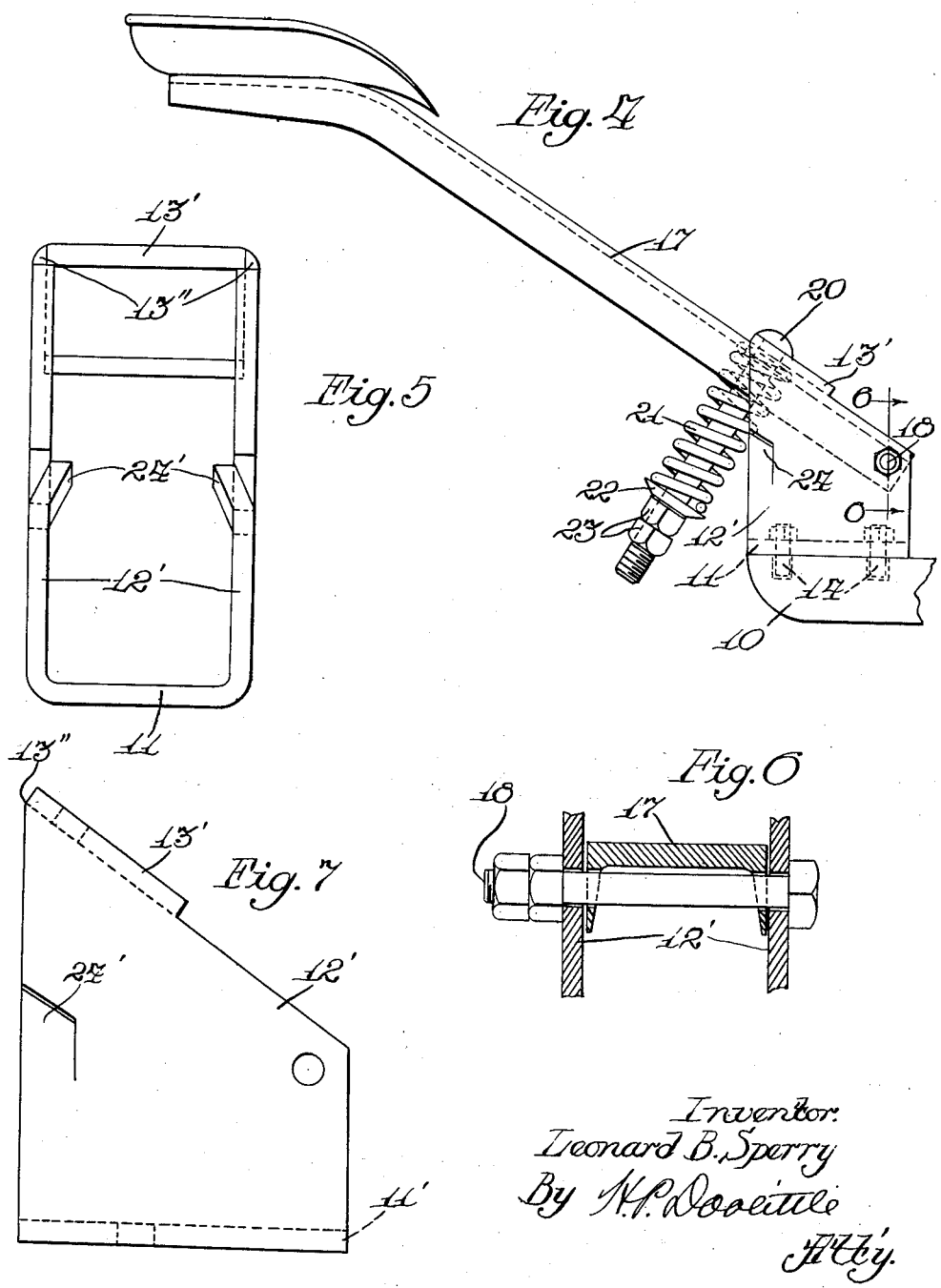
Inventor:
Leonard B. Sperry
By N. P. Doolittle
Atty.

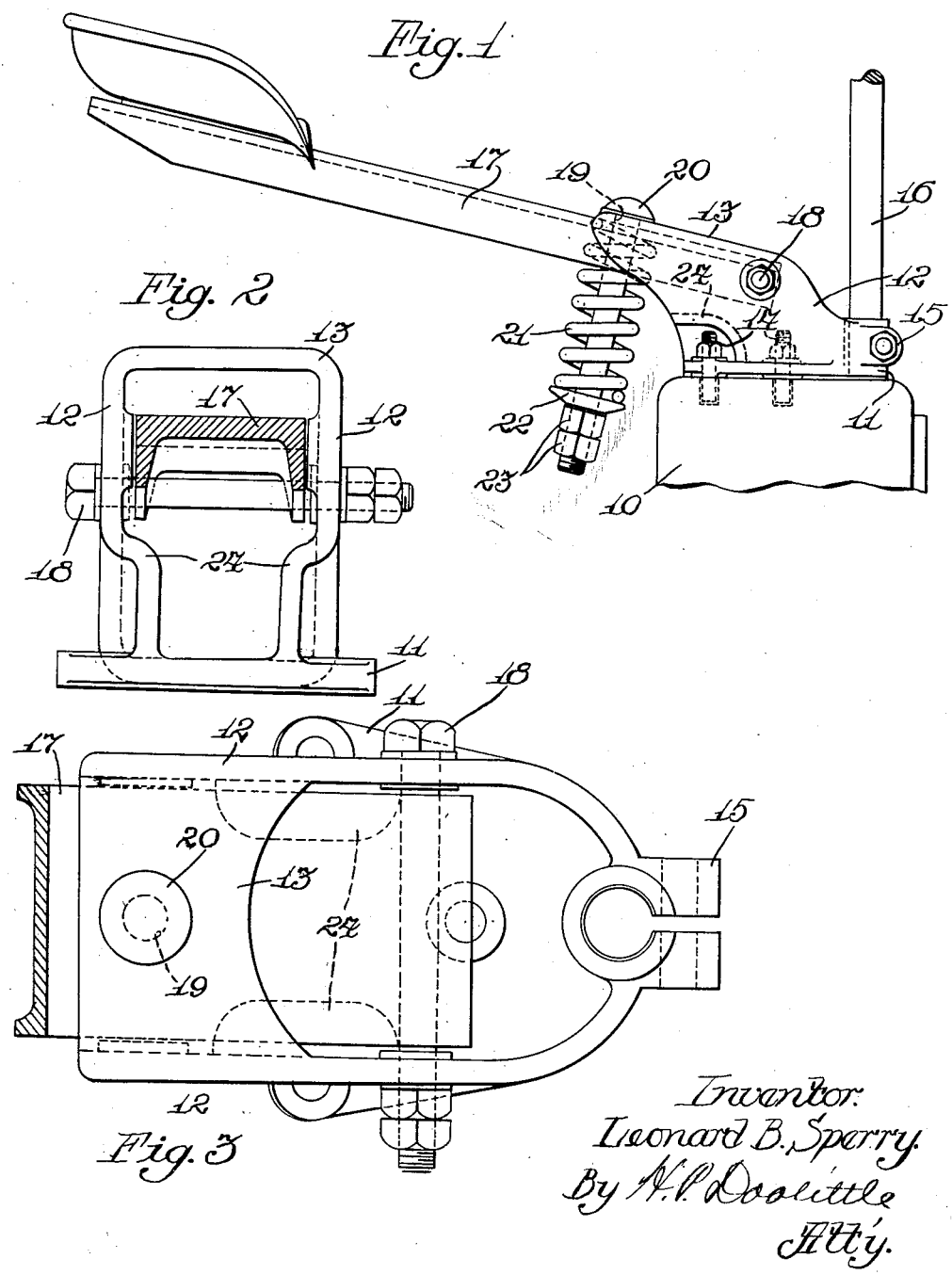

Patented June 21, 1932

1,864,282

UNITED STATES PATENT OFFICE

LEONARD B. SPERRY, OF WESTERN SPRINGS, ILLINOIS, ASSIGNOR TO INTERNATIONAL HARVESTER COMPANY, A CORPORATION OF NEW JERSEY

SEAT SUPPORT

Application filed April 26, 1930. Serial No. 447,529.

The present invention has to do with improvements in seat supports of the kind commonly employed in agricultural implements, and especially in tractors.

The driving wheels of tractors are usually provided with lugs to increase traction. This causes the tractor to ride in a bumpy manner, which unevenness is transmitted through the frame to the seat of the tractor and causes a very uncomfortable riding condition for the operator. To overcome this, it has been proposed to provide yielding means to support the seat bar and cushion these shocks. Sometimes it happens that the yielding cushion, which frequently assumes the form of a spring, gives way, causing the seat bar to drop suddenly, frequently throwing the operator to the ground and endangering his life.

Therefore, this invention particularly relates to the provision of a safety means to overcome this danger.

Accordingly, the primary object of this invention is to provide a safety means for the seat bar to limit its drop in the event that the spring support should break; another object is to provide an improved seat supporting bracket; and, lastly, it is a general object of the invention to provide seat mounting for implements, such for example as tractors.

Such objects may be achieved by the illustrative example of the invention herein disclosed, as will later more fully appear.

In the drawings:

Figure 1 is a side view of a preferred example of the invention in which the seat supporting bracket assumes the form of a casting;

Figure 2 is a cross sectional view of the bracket as viewed from the rear;

Figure 3 is a plan view of the seat supporting bracket;

Figure 4 is a side view similar to the showing in Figure 1 and showing an alternative form of seat supporting bracket;

Figure 5 is a rear view of the bracket shown in Figure 4;

Figure 6 is a cross sectional view as seen along the line 6—6 appearing in Figure 4; and, Figure 7 is a side view of the modified bracket.

For purposes of illustration there has been shown a frame 10, which may be any suitable part of an implement designed to carry a seat, such for example as the frame of a tractor. The form of the invention shown in Figures 1, 2 and 3 comprises an integrally formed casting having a base 11 and spaced side walls 12 with a top plate 13 formed thereon. As shown in Figure 1, the side walls 12 and top plate 13 are tapered off rearwardly to provide an overhang in back of the frame part 10. The base 11 is secured by bolts 14 in any appropriate manner to the frame 10. The bracket may also include at its front end a pinch bind 15 for securement to an additional part, such for example as the standard 16 shown.

A seat supporting bar 17 (see Figures 1, 2, 3, 4 and 6) shown generally in the shape of a channeled section, the same being inverted. The bar 17 has its front end pivotally connected to a transverse bolt 18 carried in the side walls 12 of the bracket. The top plate 13 adjacent its back edge is provided with a hole 19 to receive a headed bolt 20, which hangs downwardly, as shown in Figure 1, and extends centrally through the bar 17 midway between the channeled side flanges thereof. A spring cushion 21 encircles the bolt 20, the same being disposed at substantially a right angle to the bar 17 and held on the bolt by a cap 22 and lock nuts 23. As shown in Figures 1 and 4, the seat support bar 17 rests on this spring 21 so that the up and down pivotal movement thereof is cushioned by the spring to absorb shock.

As has been already indicated, this spring 21 might break. As a result, the bar 17 will suddenly drop to an extent sufficient to throw the operator from his seat. Accordingly, the side walls 12 of the bracket are each inwardly curved to form stops 24 adapted to be contacted by the side flanges of the channel bar 17 to limit the dropping movement of said bar 17, as will be readily understood. The bracket shown in Figures 1, 2 and 3 is preferably cast as an integral piece.

In Figures 4, 5, 6 and 7, a modified bracket is shown, which is made of sheet metal and formed to have a base 11', side walls 12', and a top plate 13', welded as indicated at 13" to the top edge of the side walls 12'. The stops here are formed by slitting the side walls 12' and bending the same inwardly, as indicated at 24'. The seat support 17 is mounted in identically the same manner, as indicated in Figure 1, and, therefore, need not be described. Here again, in the event that the spring should break, the bar 17 would be limited in its dropping movement by contacting the stops 24'.

From this disclosure it must now be clear that an improved seat supporting means is provided by this invention, which is simple and inexpensive to produce and obviously achieves all of the desirable objects heretofore recited.

It is the intention to cover all such changes and modifications of the examples herein shown by way of illustration as do not depart from the spirit and scope of the invention, as indicated in the following claims.

What is claimed is:

1. In combination, a frame, a bracket carried thereby, a seat supporting bar pivotally connected at one end to the bracket, a spring support for the bar carried by the bracket, and a rigid stop provided on the bracket to limit the drop of the bar should the spring support break.

2. In combination, a frame, a bracket having spaced side walls and secured on the frame, a top plate on the walls, a seat supporting bar pivotally connected at one end to the bracket, a spring support carried by the top plate, said seat bar resting thereon, and means associated with a bracket wall to limit the drop of the bar should the spring support break.

3. In combination, a frame, a bracket having spaced side walls and secured on the frame, a top plate on the walls, a seat supporting bar pivotally connected at one end to the bracket between the side walls thereof, a spring support carried by the top plate, said seat bar resting thereon, and a stop located on a side wall of the bracket to limit the drop of the bar should the spring support break.

4. In combination, a frame, a bracket secured thereto, said bracket including spaced side walls, a seat bar pivoted at one end to the bracket for movement between the said side walls, a yieldable support carried by the bracket for supporting the bar, said support being arranged at substantially a right angle to the bar, and a stop on each side wall of the bracket beneath the bar to limit its drop should the yieldable support accidentally break.

5. In combination, a frame, a bracket secured thereto, said bracket including spaced side walls, a seat bar pivoted at one end to the bracket for movement between the said side walls, a spring support hung from the bracket to support the bar, said support being arranged at substantially a right angle to the bar, and stops formed on the side walls of the bracket beneath the bar to limit its drop should the spring support break.

6. In combination, a frame, a bracket secured thereto, said bracket including spaced side walls, a seat bar pivoted at one end to the bracket for movement between the said side walls, said bar comprising an inverted channel section, a yieldable support carried by the bracket for supporting the bar, said support being disposed at substantially a right angle to the bar, and a stop on one of the side walls of the bracket adapted to be engaged by a flange of the channel section of the bar, whereby to limit the drop of the bar should the yieldable support break.

7. In combination, a frame, a bracket secured thereto, said bracket including spaced side walls, a seat bar pivoted at one end to the bracket for movement between the said side walls, said bar comprising an inverted channel section, a spring support carried by the bracket for supporting the bar, said support being disposed at substantially a right angle to the bar, and a stop provided on each side wall of the bracket, said stops adapted to be engaged by the flanges of the channel bar section, whereby to limit the drop of the bar should the spring support break.

8. In combination, a frame, an integrally formed bracket comprising spaced side walls and a top, means for securing the bracket to the frame, a seat supporting bar pivotally connected at one end to the bracket for movement between the side walls thereof, a spring support carrying the bar, means for hanging the spring support from the bracket top, whereby to dispose the same at substantially a right angle to the bar and integrally formed stop means provided on the bracket walls for limiting the drop of the seat bar in the event the spring support breaks.

9. In combination, a frame, a bracket secured to the frame, a seat supporting bar pivotally connected at one end to the bracket, a bolt carried by the bracket, said bold disposed at substantially a right angle to the bar and passed loosely through a hole in said bar, a coil spring encircling the bolt, a nut at one end of the bolt to stop the spring, said spring serving as a cushioned rest at its other end for the bar, and a stop on the bracket beneath the bar to limit the downward pivotal movement of the bar in the event the spring breaks.

In testimony whereof I affix my signature.

LEONARD B. SPERRY.